United States Patent [19]
Morita et al.

[11] Patent Number: 5,790,506
[45] Date of Patent: Aug. 4, 1998

[54] OPTICAL RECORDING AND REPRODUCING DEVICE

[75] Inventors: Hideji Morita, Higashihiroshima; Yasusi Seike, Toyonaka, both of Japan

[73] Assignee: Sharp Kabushiki Kaisha, Osaka, Japan

[21] Appl. No.: 863,340

[22] Filed: May 27, 1997

[30] Foreign Application Priority Data

Jun. 10, 1996 [JP] Japan .................... 8-147694

[51] Int. Cl.[6] .................. G11B 7/125; G02B 1/10
[52] U.S. Cl. ............... 369/118; 369/44.24; 369/94; 369/112
[58] Field of Search ............. 369/44.23, 44.24, 369/103, 112, 118, 94

[56] References Cited

U.S. PATENT DOCUMENTS

| 5,281,797 | 1/1994 | Tatsuno et al. | 369/118 |
|---|---|---|---|
| 5,665,957 | 9/1997 | Lee et al. | 369/118 |

FOREIGN PATENT DOCUMENTS

| 62003441 A | 1/1987 | Japan . |
|---|---|---|
| 1003833 A | 1/1989 | Japan . |
| 3062342 A | 3/1991 | Japan . |
| 6020298 A | 1/1994 | Japan . |

*Primary Examiner*—Eddie P. Chan
*Assistant Examiner*—Kim-Kwok Chu
*Attorney, Agent, or Firm*—Nixon & Vanderhye P.C.

[57] ABSTRACT

In an optical recording and reproducing device, an aperture member is provided in a region between an objective lens and a reflection mirror so as to be freely pushed into and pulled out of a light flux, and a masking member is provided on the objective lens. The masking member has an inside diameter smaller than an aperture diameter of the aperture member, and has an outside diameter greater than the aperture diameter of the aperture member. The aperture member has an outline size greater than a size of an aperture of an objective lens holding member. Therefore, an effective numerical aperture of the objective lens is determined in accordance with the inside diameter of the masking member in the case where the aperture member is placed in the light flux, whereas the effective numerical aperture is determined by the aperture of the objective lens holding member in the case where the aperture member is not placed in the light flux. With this arrangement, stable reproduction of a compact disk without being affected by a shift of the objective lens is enabled, while reproduction of a high-density disk is also enabled.

17 Claims, 12 Drawing Sheets

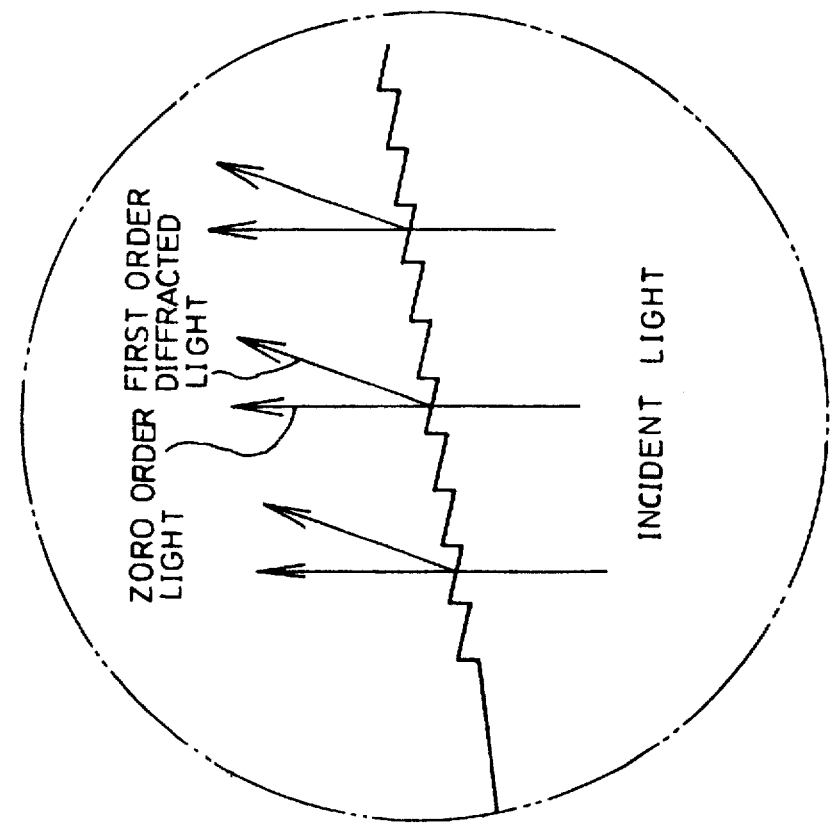
FIG.13(c)
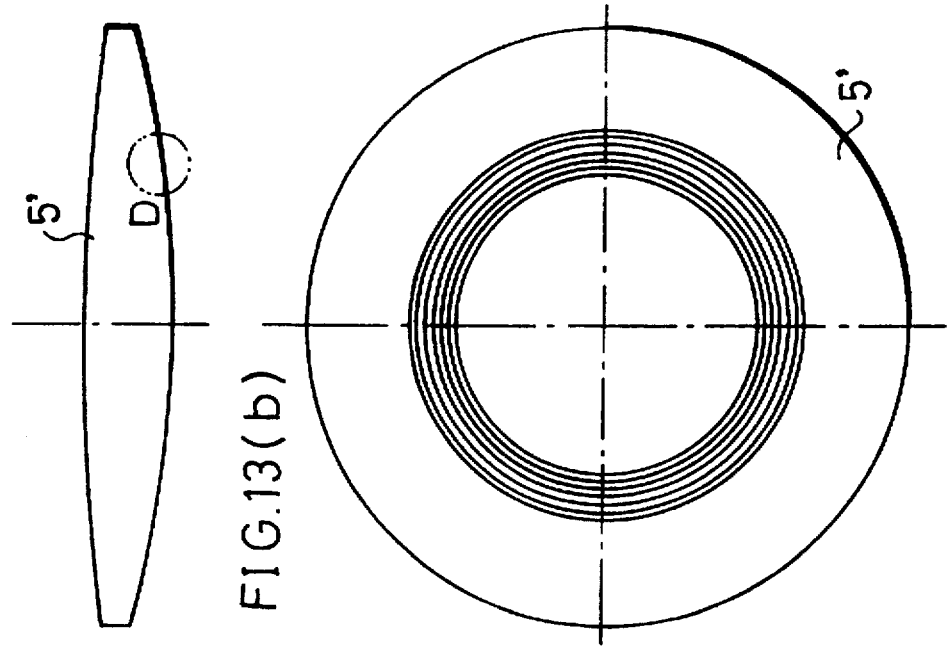
FIG.13(a)
FIG.13(b)

OPTICAL RECORDING AND REPRODUCING DEVICE

FIELD OF THE INVENTION

The present invention relates to an optical recording and reproducing device for recording, reproducing and erasing information in an information recording medium by projecting a light beam thereon.

BACKGROUND OF THE INVENTION

Studies have been conducted on optical recording and reproducing devices for recording, reproducing and erasing information in an information recording medium by projecting a light beam thereon. Especially, a lot of efforts are being made now to realize an optical recording and reproducing device which, even when used alone, is capable of recording, reproducing and erasing information in information recording media whose thicknesses and recording densities are different from each other.

For example, Japanese Laid-Open Patent Application No. 6-20298/1994 (Tokukaihei 6-20298) discloses an optical system that limits a light flux striking an objective lens by providing in an optical path an aperture member having an aperture section of an effective diameter regulated by the effective numerical aperture (NA) of the objective lens.

The optical system, as shown in FIG. 8, has an aperture diaphragm adjusting section 52 between a collimating lens 50 and an objective lens 51. The aperture diaphragm adjusting section 52 is composed of an aperture member 53 formed in, for example, a square shape and an actuator 54 for supporting the aperture member 53. At the center of the aperture member 53 is formed an aperture section 53a which is cut through with a round aperture. The diameter of the aperture section 53a is regulated by the effective NA of the objective lens 51 as mentioned above. The actuator 54 pushes the aperture member 53 into a light flux 55 and pulls the aperture member 53 out of the light flux 55 by moving the aperture member 53 vertically to the light flux 55.

With the configuration, light emitted from a light source (not shown) is converted into the parallel light flux 55 by the collimating lens 50. When the aperture member 53 is pushed into the light flux 55, the light flux 55 is partly allowed pass through the aperture section 53a of the aperture member 53. Therefore, only a light flux 56 is allowed to pass, striking the objective lens 51. The light flux 56 is converged by the objective lens 51 to form a suitably sized light spot on a disk (not shown) as an information recording medium.

When the aperture member 53 is not placed into the light flux 55, the light flux 55 strikes the objective lens 51 without the diameter thereof changed to form on the disk a light spot of a size in accordance with the diameter thereof.

The diameter of the light striking the objective lens 51 is switched in this manner depending on whether or not the aperture member 53 is placed in the light flux 55. Therefore, with the configuration, it is possible to obtain different effective NA of objective lens 51, in the case where the aperture member 53 is placed in the light flux 55 and in the case where the aperture member 53 is not placed in the light flux 55, thereby causing the size of the light spot formed on the disk to be changed suitably to kinds of disks. As a result, the optical recording and reproducing device, even when used alone, can record, reproduce and erase information in information recording media whose thicknesses and recording densities are different from each other.

However, with the above conventional configuration, in the case where the objective lens 51 follows, for example, eccentricity of the disk and shifts in a track direction of the disk, the light flux 56 limited by the aperture member 53 does not strike the right region on the objective lens 51. As a result, there arises a problem of not being able to form on the disk a light spot having a size changeable so as to be suitable for various kinds of disks.

SUMMARY OF THE INVENTION

The object of the present invention is to provide an optical recording and reproducing device capable of accurately forming a light spot having a size suitable for an information recording medium on which the light spot is formed, even in the case where an objective lens shifts.

To achieve the above-described object, an optical recording and reproducing device of the present invention includes (1) a light source for emitting a light beam to be projected on an information recording medium, (2) an objective lens for converging the light beam on the information recording medium, (3) an objective lens holding member for holding the objective lens, (4) a first aperture member for changing a light flux diameter of the light beam, the first aperture member being provided in an optical path of the light beam, between the light source and the objective lens, and (5) a second aperture member having an aperture diameter smaller than an aperture diameter of the objective lens holding member as well as smaller than an aperture diameter of the first aperture member, the second aperture member being concentric with the objective lens and moving in an interlocked manner with the objective lens.

According to the above-described arrangement, the light beam strikes the objective lens, with the light flux diameter of the light beam emitted from the light source being reduced by the first and second aperture members. The light beam is converged by the objective lens and projected onto the information recording medium. As a result, the light spot is formed on the information recording medium.

Here, since the second aperture member has an aperture which is smaller than the aperture of the objective lens holding member which holds the objective lens and is smaller than the aperture of the first aperture member, the effective NA of the objective lens is determined by the second aperture member. Besides, since the second aperture member is provided so as to be concentric with the objective lens and so as to move in an interlocked manner with the objective lens, the optical axis of the light beam striking the objective lens does not deviate from the center of the objective lens even though the objective lens follows, for example, eccentricity of the information recording medium and shifts in a track direction of the information recording medium.

Incidentally, in a conventional arrangement, since it does not have the second aperture member, a shift of the objective lens in the track direction of the information recording medium causes the light beam, whose diameter has been reduced by the first aperture member, to deviate from a right optical path when entering the objective lens. Therefore, the light beam is not correctly converged, thereby resulting in that a light spot with an appropriate size cannot be formed on the information recording medium.

In contrast, in the arrangement of the present invention, in the case where the objective lens shifts in the track direction of the information recording medium, the second aperture member follows a shift of the objective lens, since the second aperture member is interlocked with the objective lens. As a result, unlike the conventional cases, the light beam to enter the objective lens does not deviate from the right optical path and is always caused to accurately enter the objective lens irrelevant to movements of the objective lens.

Therefore, a light spot having a suitable size can be formed on the information recording medium, not affected by, for example, movements of the objective lens. As a result, recording, reproduction and erasion of information can be stably carried out, whether or not the objective lens shifts. Thus, with the use of this arrangement, it is possible to provide liable devices of excellent quality.

For a fuller understanding of the nature and advantages of the invention, reference should be made to the ensuing detailed description taken in conjunction with the accompanying drawings.

BRIEF DESCRIPTION OF THE DRAWINGS

FIG. 13(a) is a cross-sectional view of a hologram lens.

FIG. 13(b) is a plan view of FIG. 13(a).

FIG. 13(c) is an enlarged view of a section D of FIG. 13(a).

DESCRIPTION OF THE PREFERRED EMBODIMENTS

The following description will discuss an embodiment of the present invention while referring to FIGS. 1 through 7, and 9 through 15.

Figure 1:
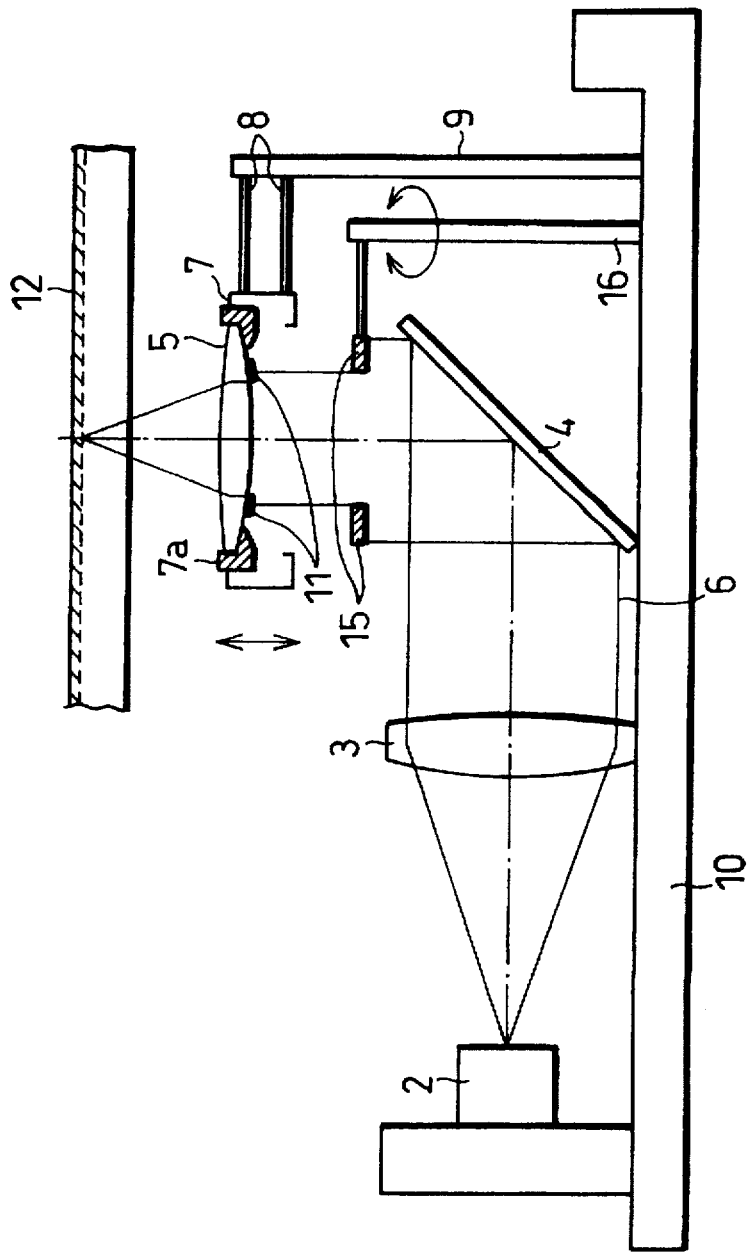
FIG. 1 is a view illustrating an arrangement of an optical recording and reproducing device in accordance with the present embodiment of the present invention.

FIG. 1 is a view illustrating a structure of an optical recording and reproducing device in accordance with the present embodiment, wherein in this case a reproducing operation is carried out with respect to a 1.2-mm-thick compact disk 12 exclusively for reproduction which has been mass-produced and widely used. As shown in the figure, the optical recording and reproducing device incorporates a light source 2 composed of a semiconductor laser, a collimating lens 3, a reflection mirror 4, an aperture member 15 (first aperture member) and an objective lens 5.

The collimating lens 3 converts light emitted from the light source 2 into a parallel light flux 6. The reflection mirror 4 is disposed to reflect the light flux 6 coming from the collimating lens 3 and deflect the light flux 6 to the objective lens 5.

The aperture member 15 is supported by a base 16, which is attached to a housing 10, while the light source 2, the collimating lens 3, and the reflection mirror 4 are similarly attached to the housing 10. Here, the base 16 is rotatably provided so that the aperture member 15 can be freely pushed into and pulled out of the light flux 6. The aperture member 15 has an aperture with which the light flux 6 is limited to a predetermined amount when the aperture member 15 is placed in the light flux 6. The aperture member 15 is made by molding metal, resin, or the like in a mold.

Figure 5:
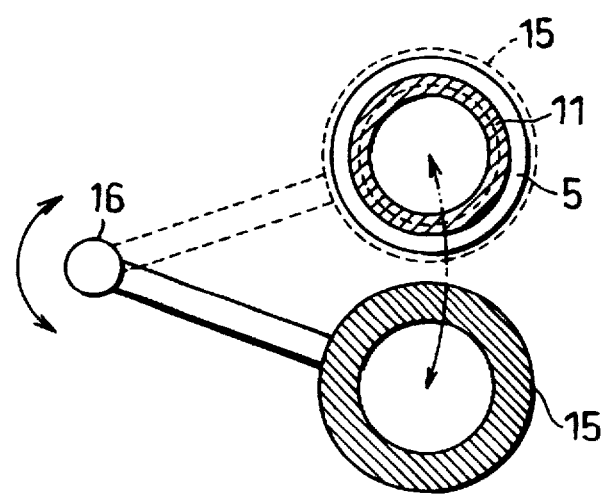
FIG. 5 is a plan view illustrating a state wherein the aperture member is placed and a state wherein the aperture member is removed.

FIG. 5 is a plan view illustrating an objective lens 5 having a masking member 11 which will be described later and the aperture member 15. A state wherein the aperture member 15 is not placed in the light flux 6 is illustrated with solid lines. When the aperture member 15 is pushed into the light flux 6 by rotating the base 16, the objective lens 5 and the aperture member 15 are provided so as to overlap each other, as illustrated with broken lines.

Figure 3:
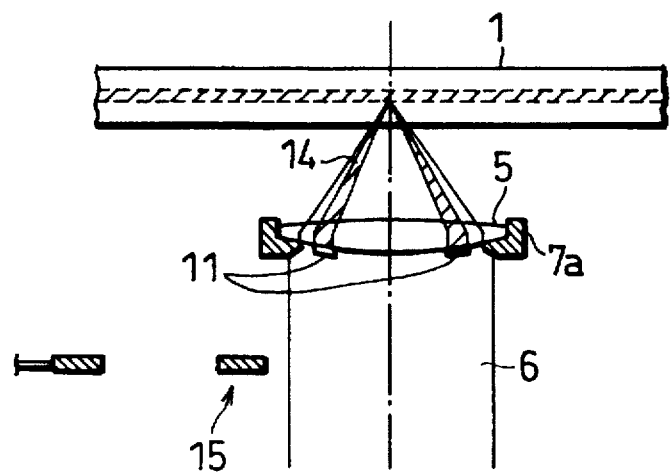
FIG. 3 is an explanatory view illustrating a state wherein a reproducing operation is carried out with respect to a high-density disk without an aperture member placed in an optical path.

As illustrated in FIG. 1, the objective lens 5 has a function of converting the light flux 6 in a direction from the reflection mirror 4, and forms a light spot on a signal surface of the compact disk 12 (second information recording medium). The objective lens 5 is designed for the use with a high-density disk 1 (first information recording medium) which is made by combining two 0.6-mm-thick substrates, as illustrated in FIG. 3. The objective lens 5 is fixed in an objective lens holding member 7a. The objective lens holding member 7a is attached to a holding body 7, and the holding body 7 is supported by a supporting member 8 which has flexibility and hence can swing in any direction such as upward, downward, leftward, and rightward. A base 9 supporting the supporting member 8 is fixed to the housing 10.

Figure 2A:
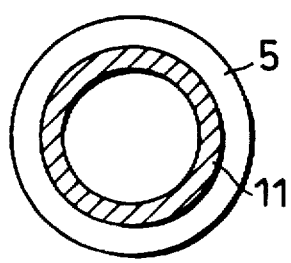
FIG. 2(a) is a plan view illustrating an objective lens to which a masking member is attached.

On one of sides of the objective lens 5 which the light flux 6 strikes, there is provided the masking member 11 (second aperture member) for reducing the light flux 6 to enter the objective lens 5. FIG. 2(a) is a plan view illustrating the masking member 11 attached to the objective lens 5.

As shown in FIG. 2(a), the masking member 11 is formed in a ring shape that is concentric with the objective lens 5. Therefore, the light flux 6 entering the objective lens 5 is substantially separated into the light flux passing inside the masking member 11 and the light flux passing outside the periphery of the masking member 11.

Figure 4:
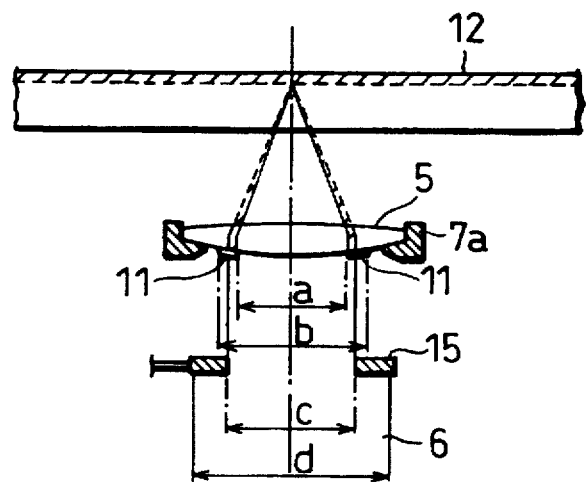
FIG. 4 is an explanatory view illustrating a state wherein a reproducing operation is carried out with respect to a compact disk with the aperture member placed in the optical path.

The following description will explain sizes and positions of the masking member 11 and the aperture member 15, while referring to FIG. 4.

The masking member 11 has an inside diameter 'a' as an aperture diameter such that an effective NA of the objective lens 5 is determined so that a desired light spot is formed on the signal surface of the compact disk 12. In other words, the masking member 11 is arranged so as to have the inside diameter 'a' smaller than an aperture diameter 'c' of the aperture member 15.

The masking member 11 has an outside diameter 'b' greater than the aperture diameter 'c' while smaller than the aperture diameter of the objective lens holding member 7a. Besides, the aperture member 15 has an outline size greater than a size of a cross section of the light flux 6 having a light flux diameter 'd' and greater than a size of the aperture of the objective lens holding member 7a.

Thus, the masking member 11 and the aperture member 15 are arranged so as to overlap each other. Since they are arranged to overlap to such an extent that even though the objective lens 5 follows, for example, eccentricity of the disk, and shifts in a track direction of the disk, this shift does not cause a reverse affect. Note that a distance of the shift of the objective lens 5 in the track direction of the disk due to the eccentricity of the disk or the like is usually more or less 0.1 mm, and it reaches at most 0.3 mm during an access operation. Therefore, the inside diameter 'a', the outside diameter 'b', and the aperture diameter 'c' are preferably set to around 2.3 mm, 3.1 mm to 3.5 mm, and 2.7 mm to 2.9 mm, respectively.

In order to cope with any shift in any direction, right or left with respect to the tracking direction, the aperture diameter 'c' of the aperture member 15 is set to a mean value of the inside diameter 'a' of the masking member 11 and the outside diameter 'b' of the same, so as to be coincident with a mean diameter of the masking member 11. Note that the mean diameter means a diameter of a circle whose circumference falls on the center of the width of the masking member 11.

Figure 6:
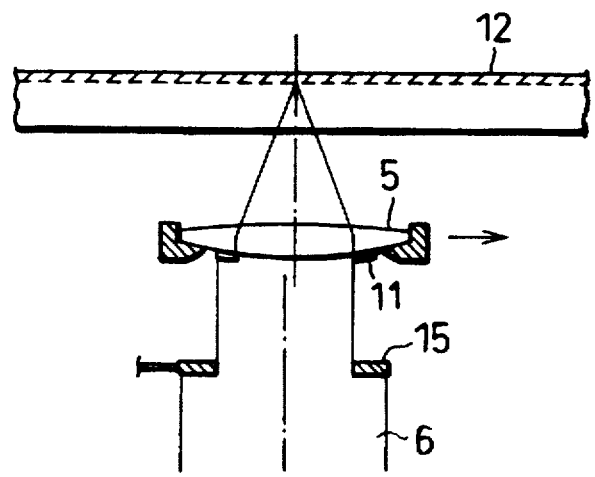
FIG. 6 is an explanatory view illustrating a state of light conversion in the case where the objective lens shifts in a track direction of the compact disk.
Figure 7:
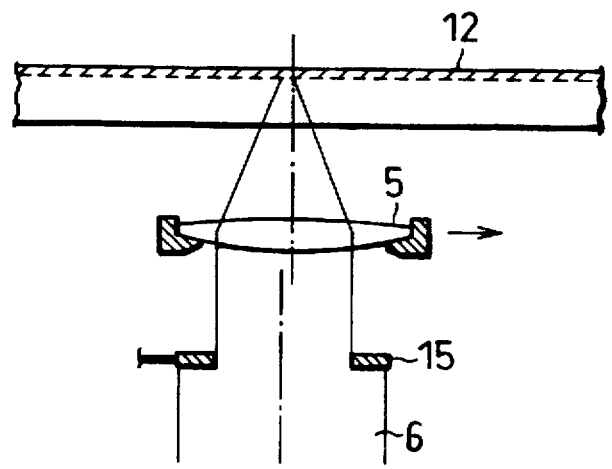
FIG. 7 is an explanatory view illustrating a state of light conversion by a conventional optical recording and reproducing device in the case where an objective lens shifts in the track direction of the compact disk.
Figure 8:
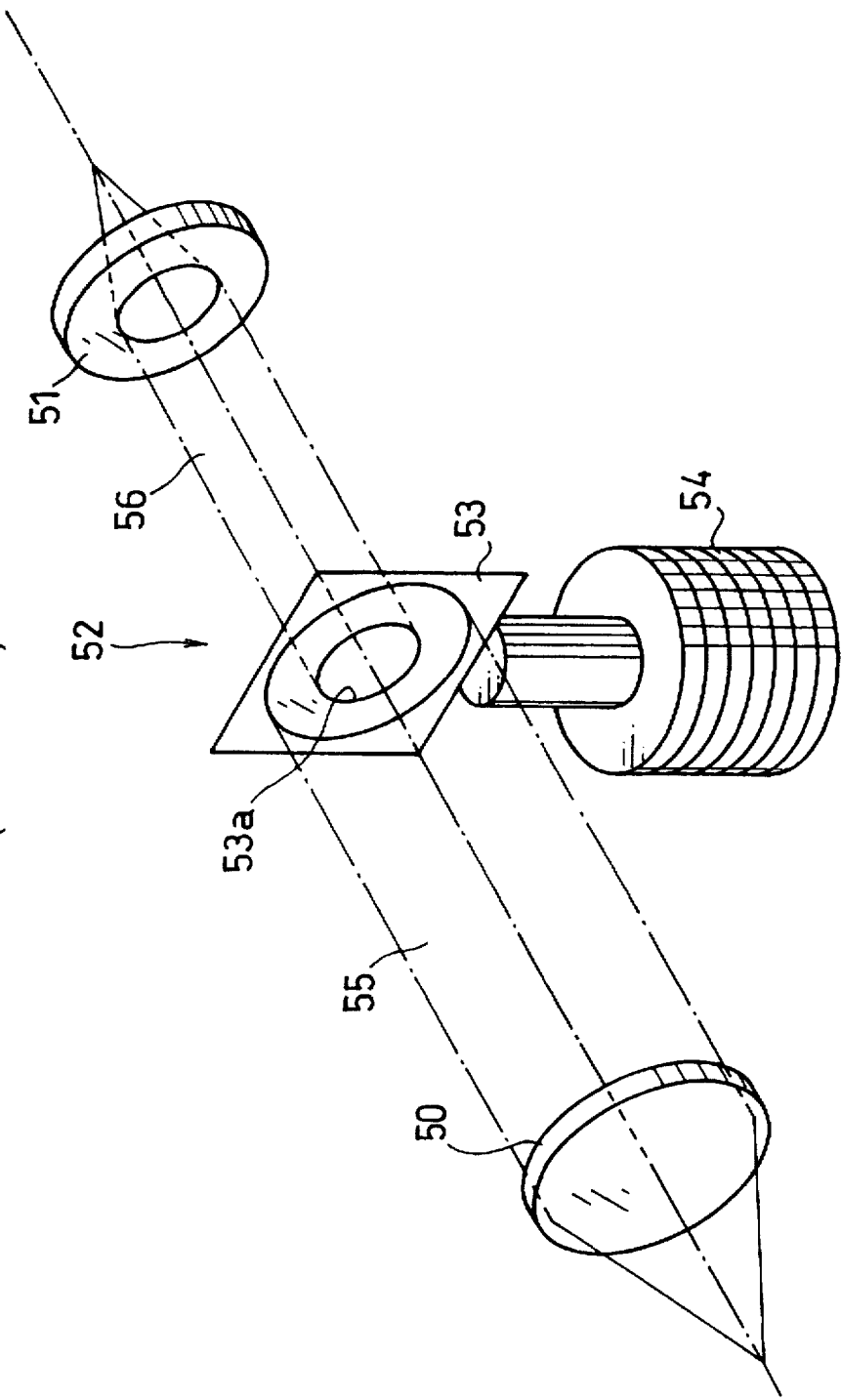
FIG. 8 is a perspective view illustrating an arrangement of the conventional optical recording and reproducing device.

The following description will explain reproducing operations with respect to a 1.2-mm-thick compact disk in the above-described arrangement, while referring to FIGS. 1, 4, and 6.

In this case, the aperture member 15 is placed in the light flux 6. During the reproducing operation with respect to the compact disk 12, light emitted from the light source 2 reaches the objective lens 5 as the light flux 6, through the collimating lens 3, the reflection mirror 4, and the aperture member 15. Then, the light flux 6 is converged by the objective lens 5 thereby forming a spot on the signal surface of the compact disk 12. By doing so, information in the compact disk 12 is read out.

Here, since the inside diameter 'a' of the masking member 11 is smaller than the aperture diameter 'c' of the aperture member 15, the effective NA of the objective lens 5 is determined depending on the masking member 11. A part of the light flux 6 passing outside the periphery of the masking member 11 is blocked by the aperture member 15, only the other part of the light flux 6 passing inside of the masking member 11 is converged substantially to a point on the signal surface of the compact disk 12. In this case, since an injection angle with respect to the compact disk 12 is nearly a right angle and hence aberration is relatively small around a center close to the optical axis, reproduction characteristics at a practical level can be obtained. Moreover, since the objective lens 5 is designed for the use with the high-density disk 1 (see FIG. 3), the light spot is caused to have a smaller diameter by making the effective NA smaller, thereby having a suitable spot diameter for reproducing information from the compact disk 12.

Here, as illustrated in FIG. 6, even in the case where the objective lens 5 shifts, for example, in the track direction of the compact disk 12 due to a certain cause, the optical axis of the light flux 6 entering the objective lens 5 by no means shifts from the center of the objective lens 5, since the masking member 11 is interlocked with the objective lens 5 with a center thereof coincident with that of the objective lens S. In other words, even though the objective lens 5 shifts, an edge of the part of the light flux 6 which is not blocked by the aperture member 15 is always positioned on the masking member 11, thereby resulting in that only the light passing inside the masking member 11 is converged substantially to a point on the compact disk 12.

Note that in the case of a conventional arrangement wherein the masking member 11 is not provided, a shift of the objective lens 5 in the track direction of the compact disk 12 causes the light flux 6, whose diameter has been reduced by the aperture member 15, to deviate from a right optical path before entering the objective lens 5. Therefore, the light flux 6 is not correctly converged, and aberration occurs. As a result, a light spot with an appropriate size cannot be formed on the compact disk 12.

In contrast, according to the present embodiment, the effective NA of the objective lens 5 is determined so that no change is caused to the light flux diameter even though the objective lens shifts. Moreover, the masking member 11 is interlocked with the objective lens 5. Therefore, when the objective lens 5 shifts in the track direction of the compact disk 12, the masking member 11 follows the shift of the objective lens 5.

As a result, unlike the conventional cases, the light flux 6 to enter the objective lens 5 does not deviate from the right optical path and is always caused to accurately enter the objective lens 5 irrelevant to movements of the objective lens 5. Therefore, it is possible to improve characteristics obtained when the objective lens 5 shifts in the track direction. As a result, only extremely small aberration is caused, and reading information from the compact disk 12 can be stably carried out.

Furthermore, since the aperture member 15 is provided separate and independent of the masking member 11, an information recording and reproducing device can be manufactured only by adding the masking member 11 to a conventional optical recording and reproducing device in the case where the device has a conventional aperture member whose aperture diaphragm can be changed so as to become suitable for information recording media with different thicknesses. Thus, the device can be manufactured easily.

Moreover, since the masking member 11 is provided directly on a lens surface of the objective lens 5, the arrangement can be simplified and the device can be lightened, while deviation of the masking member 11 with respect to the objective lens 5 due to aging is less likely caused. Therefore, mass production of high-performance masking members 11 is possible.

The following description will explain a reproducing operation with respect to a high-density disk 1 which is made by combining two 0.6-mm-thick substrates, while referring to FIG. 3. FIG. 3 is a view illustrating a schematic arrangement during this operation.

In this case, the aperture member 15 is not placed in the light flux 6. As in the case where the reproducing operation is carried out with respect to the compact disk 12 (see FIG. 1), light emitted from the light source 2 reaches the objective lens 5 as light flux 6, through the collimating lens 3 and the reflection mirror 4. Then, the light flux 6 is converged by the objective lens 5. By doing so, a light spot is formed on a signal surface of the high-density disk 1.

Here, since the aperture member 15 is not placed in the light flux 6 and hence the light flux 6 is projected on the objective lens 5 with a diameter of the light flux 6 unchanged, the effective NA is determined depending on the aperture of the objective lens holding member 7a. Besides, since the masking member 11 described above is provided on the objective lens 5, a part of the light flux 6 projected onto the objective lens 5 is blocked by the masking member 11. As a result, a non-light flux portion 14 as illustrated in FIG. 3 is formed.

Here, the formation of the non-light flux portion 14 slightly reduces the quantity of the light, but this does not cause aberration. Therefore, light that have passed through the objective lens 5, not being blocked by the masking member 11 (i.e., the light flux having passed inside the masking member 11 and the light flux having passed outside the periphery of the masking member 11), is converged substantially at one spot, by the objective lens 5 designed for the high-density disk 1. As a result, the high-density disk 1 is little affected by aberration and stably reproduced.

As has been described, different effective NA of the objective lens 5 can be obtained in the case where the light passing outside the periphery of the masking member 11 is blocked and in the case where the same light is not blocked, thereby making it possible to change a conversion position of a light beam projected onto a disk, such as the high-density disk 1 or the compact disk 12. By thus arranging an optical recording and reproducing device, the device is capable of, even when used alone, accurately forming a light spot on disks having different thicknesses and recording densities. As a result, recording, reproduction, and erasion of information can be stably carried out with one device with respect to different types of disks.

Note that light reflected by a signal surface of a disk, such as the high-density disk 1 or the compact disk 12, is not affected by the masking member 11. The reason for this is as follows. Basically, a light flux has a cylindrical shape, and the light from the objective lens 5 and the light reflected by the disk are symmetrical with respect to the optical axis. Here, since the ring-shaped masking member 11 and the objective lens 5 are concentrically provided, the light that has passed through the objective lens 5 without being blocked by the masking member 11 is by no means blocked by the masking member 11 after being reflected by the disk. If the light blocked by the masking member 11 is transmitted through the masking member 11, the light, reflected by the disk, is returned to a position of the masking member 11 symmetrical to the position where the light was transmitted. In such a case, the quantity of reflected light received by a light receiving element (not shown) may slightly decrease, but the light spot is not distorted.

The following description will explain a method for forming the masking member 11.

The masking member 11 is formed by coating in that shape a surface of the objective lens 51 or by providing a molding made by molding metal, resin, or the like in a mold, as in the case of the aperture member 15, directly onto a surface of the objective lens 5. Note that it is preferable to form it by coating, since in such a case, a weight to which the holding body 7 is subject is reduced, thereby ensuring that the objective lens 5 is held without its sensitivity deteriorated.

In addition, the masking member 11 can be made of half-transparent material, or opaque material, depending on types of disks.

A half-transparent masking member 11 is made of, for example, a material used for a half mirror that is generally adopted in an optical system of a pickup, that is, a dielectric multilayer film formed on a flat glass surface. The half-transparent masking member 11 is formed by masking the central and peripheral regions on the objective lens 5, and forming the dielectric multilayer film on the non-masked region with vapor deposition. It is possible to adjust the quantity of light passing through the half-transparent masking member 11 at this stage of forming the dielectric multilayer film. Alternatively, the half-transparent masking member 11 is formed with material other than the dielectric multilayer film, such as, a dying material used for spectacles.

Thus, with this arrangement wherein the masking member 11 is made of the half-transparent material, in the case where the high-density disk 1 is reproduced, i.e., in the case where the effective NA of the objective lens 5 is determined by the objective lens holding member 7a, a quantity of light blocked by the masking member 11 is smaller, thereby resulting in that a greater quantity of light is projected on the signal surface of the high-density disk 1. Therefore, more desirable results can be obtained, and even disks having low reflectances, multilayer disks, or the like, can be stably reproduced.

Note that in the case where the compact disk 12 is reproduced, that is, in the case where the effective NA is determined by the masking member 11, a greater effective NA is obtained by the use of a half-transparent material for the masking member 11, thereby causing aberration to occur more often. However, it is possible to find by experiments the quantity of light passing through the masking member 11 which makes a virtual effective NA small and causes substantially no aberration.

On the other hand, in the case where the masking member 11 is made of opaque material, the masking member 11 can be also formed by a method other than the vapor deposition, for example, by using metal or resin and etching it. By forming the masking member 11 with opaque material, a part of the light flux 6 projected on the masking member 11 is completely blocked. Therefore, in the case where the effective NA is determined by the masking member 11, aberration can be prevented. As a result, a desirable light spot can be formed on an information recording medium.

Table 1 below shows results of an experiment with the use of an example wherein the masking member 11 are formed so as to have no transmittance, that is, the masking member 11 is made of opaque material. Note that, in the table, X of the item of "aberration" shows wave lengths of the light beam launched from the light source 2, and the item of "light quantity" shows relative values of quantities of light entering the high-density disk 1, in the case where the light quantity without the masking member 11 is given as 1.

TABLE 1

| | COMPACT DISK | HIGH-DENSITY DISK |
|---|---|---|
| NA | 0.35 | 0.06 |
| INSIDE DIAMETER a | φ2.3 mm | φ2.3 mm |
| OUTSIDE DIAMETER b | φ3.1 mm | φ3.1 mm |
| APERTURE DIAMETER c | φ2.7 mm | — |
| SPOT DIAMETER | φ1.5 mm | φ0.9 μm |
| ABERRATION | 0.054 λ | 0.006 λ |
| LIGHT QUANTITY | about 0.6 | about 0.8 |

From Table 1, it can be found that since the masking member 11 had a width of 0.4 mm, in the case where the compact disk 12 was used, a normal light spot could be obtained even though the objective lens 5 shifts by up to 0.2 mm. Substantially no influence of the masking member 11 on a shape of the light spot formed on the high-density disk 1 was observed.

In the case where the masking member 11 is made of half-transparent material, it can be considered that increase of the light quantity causes preferable influence on operations with respect to the high-density disk 1, whereas it causes reverse influence on operations with respect to the compact disk 12. Therefore, in this case, a transmittance which on the whole not reversely affects reproduction characteristics of the high-density disk 1 and the compact disk 12 may be selected.

Figure 2B:
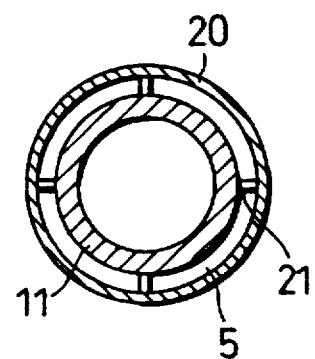
FIG. 2(b) is a plan view illustrating an objective lens to which a masking member as well as a supporting member and a connective member are attached.

The invention is not limited by the description of the present embodiment that has only explained the arrangement wherein the ring-shaped masking member 11 is provided on the objective lens 5, as illustrated in FIG. 2(a). As shown in FIG. 2(b), a supporting member 20 may be provided on the peripheral region on the objective lens 5, and then the masking member 11 may be formed via connecting members 21 inside the supporting member 20, using the supporting member 20 as the reference position. By doing to, the center of the masking member 11 and that of the objective lens 5 coincide more correctly.

In the present embodiment, although the masking member 11 is directly formed on the objective lens 5, there is an alternative. For example, the masking member 11 is formed on a flat glass sheet, and that flat glass sheet is provided close to the objective lens 5 between the aperture member 15 and the objective lens 5, so as to move in an interlocked manner with a shift of the objective lens 5.

In this case, when the quality of the masking member 11 deteriorates, only to change the flat glass sheet is needed, and to change the other parts of the optical system is not required. Therefore, it is possible to repair it at a low cost without difficulties.

As has been so far described, according to the arrangement of the present embodiment, the light flux 6 striking the objective lens 5 is partly blocked with the masking member 11 or half transmitted through the masking member 11. However, the practically same effect as that of the above-described arrangement can be produced by, instead of providing the masking member 11, changing the cross-sectional shape of the region on the surface of the objective lens 5 where the masking member 11 would be provided, so that the light striking that portion is, for example, dispersed.

Figure 9:
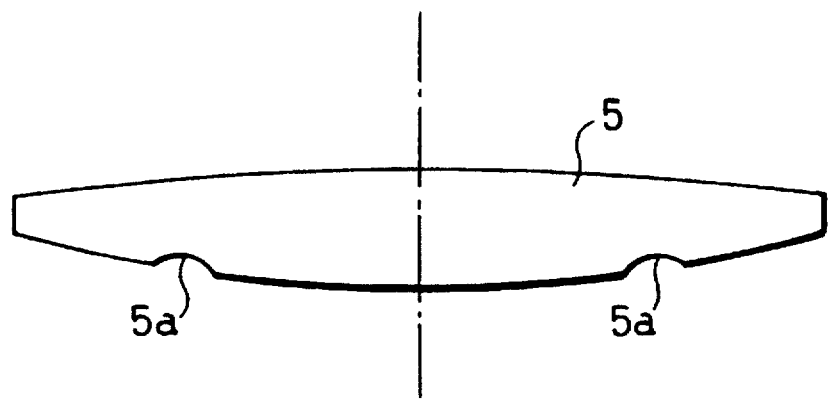
FIG. 9 is a cross-sectional view illustrating another shape of the objective lens of the present invention.
Figure 10:
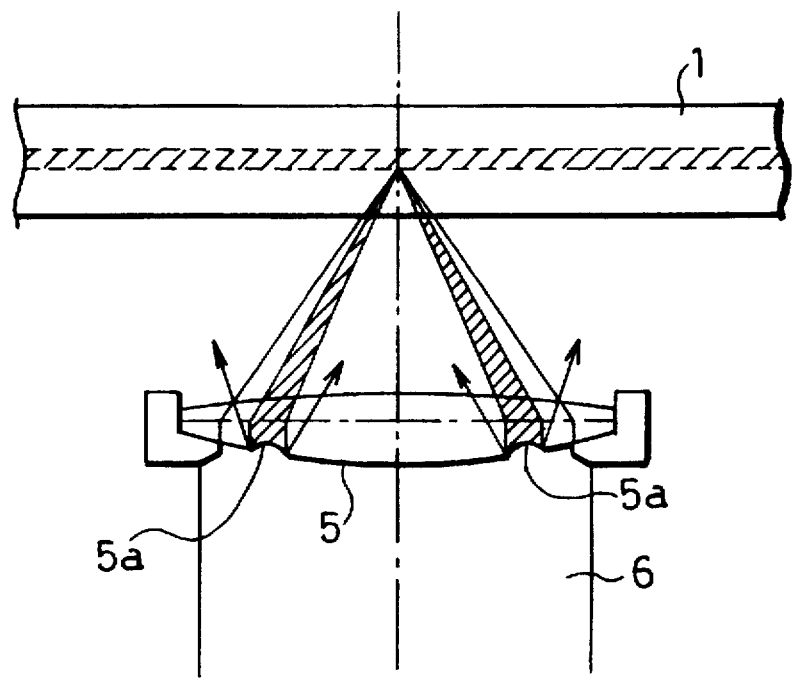
FIG. 10 is an explanatory view illustrating a state wherein a reproducing operation is carried out with respect to a high-density disk with the use of the objective lens shown in FIG. 9.
Figure 11:
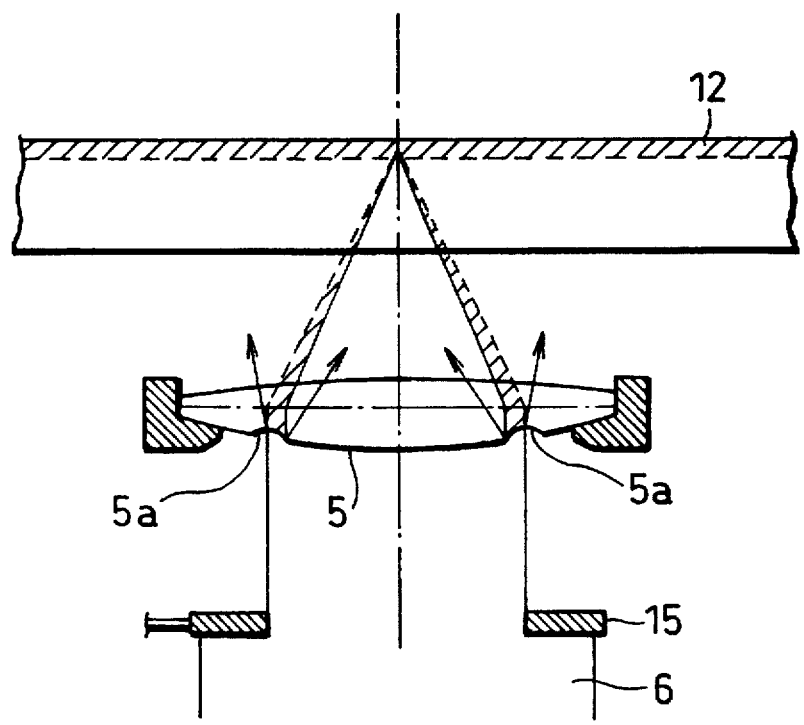
FIG. 11 is an explanatory view illustrating a state wherein a reproducing operation is carried out with respect to the compact disk with the use of the objective lens shown in FIG. 9.
Figure 12:
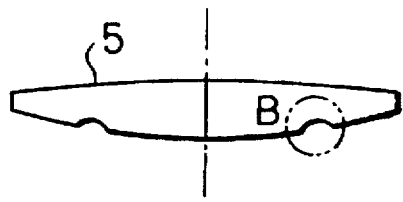
FIG. 12(a) is a cross-sectional view illustrating still another shape of the objective lens.
FIG. 12(b) is an enlarged view illustrating three types of configuration of a section B of FIG. 12(a).
FIG. 12(c) is an enlarged view illustrating another configuration of the section B of FIG. 12(a).
FIG. 12(d) is an enlarged view of a section C of FIG. 12(c).
Figure 12:
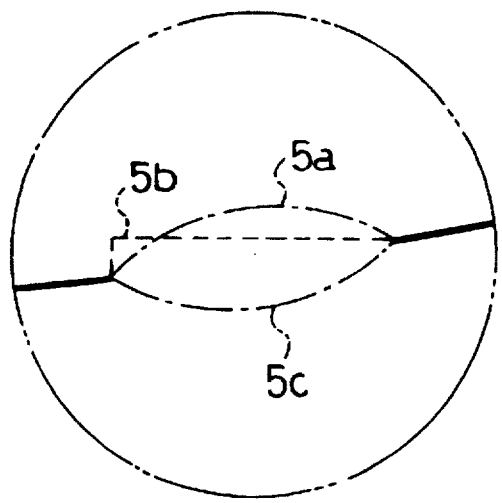
Figure 12:
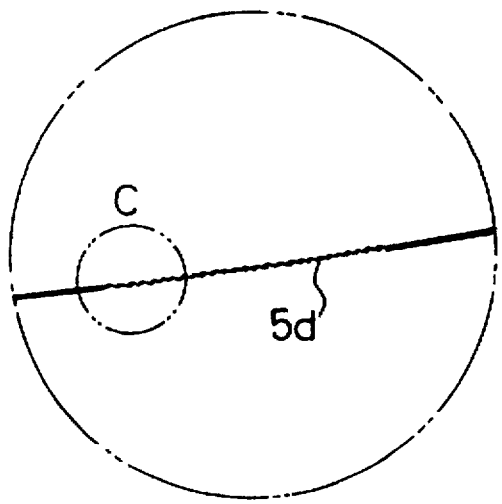
Figure 12:
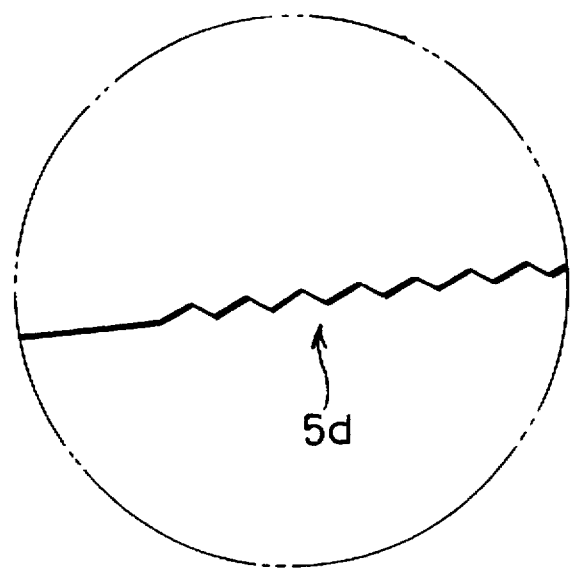

For example, as shown in FIG. 9, a concave surface portion 5a is formed in a ring-shaped region where the masking member 11 would be provided, on one of surfaces of the objective lens 5 which the light flux strikes. The concave surface portion 5a disperses a light flux striking the concave surface portion 5a of the objective lens 5 as shown in FIGS. 10 and 11. As a result, that light flux is not converged on the signal surface of the high-density disk 1 or a compact disk 12.

Alternatively, instead of forming the concave surface portion 5a, for example, a flat surface portion 5b having an L-shaped cross-section or a convex surface portion 5c may be formed where the masking member 11 would be provided, as shown in FIG. 12(b) which is an enlarged view of a section B of FIG. 12(a). Also, as shown in FIG. 12(c), a concave-convex surface portion 5d having a series of small concaves and convexes (so-called crepe, crimp or ground glass surface) may be alternatively formed (see FIG. 12(d)). A light flux striking the flat surface portion 5b is by no means converged, because the incident surface is flat. A light flux striking the convex surface portion 5c, being converged far before reaching the information recording medium, is by no means converged on the information recording medium. A light flux striking the concavo-convex surface portion 5d, being dispersed there, is by no means converged on the information recording medium.

Alternatively, as shown in FIGS. 13(a) and 13(b), the objective lens 5 may be replaced with a hologram lens 5' having concentric concaves and convexes that are formed where the masking member 11 would be provided. A zero order light simply passes through the lens, whereas first order diffracted light is dispersed, as shown in FIG. 13(c) which is an enlarged view of a section D of FIG. 13(a).

The ring-shaped surface portion where the masking member 11 would be provided may further vary in its cross-sectional shape. Any cross-sectional shape, except an ordinary shape for a lens having an ordinary refractive index, may be adopted to the ring-shaped surface portion as long as the shape causes the light striking to the surface portion to exhibit behaviors different from that of light striking an ordinary surface. However, a shape distinctly different from the ordinary shape is preferable since it causes the surface portion has a refractive index distinctly different from the ordinary one and eliminates a possibility of the blocked light interfering with the necessary light, producing a better result.

According to the above-described arrangement, the masking member 11 is provided on an incident surface of the objective lens 5, or the incident surface of the objective lens 5 is formed partly in an unusual shape on the incident surface of the objective lens 5. However, the present invention is not limited to this arrangement. The masking member 11 may be provided on a surface of the objective lens from which light outgoes, or the surface may be formed in an unusual shape.

Figure 14:
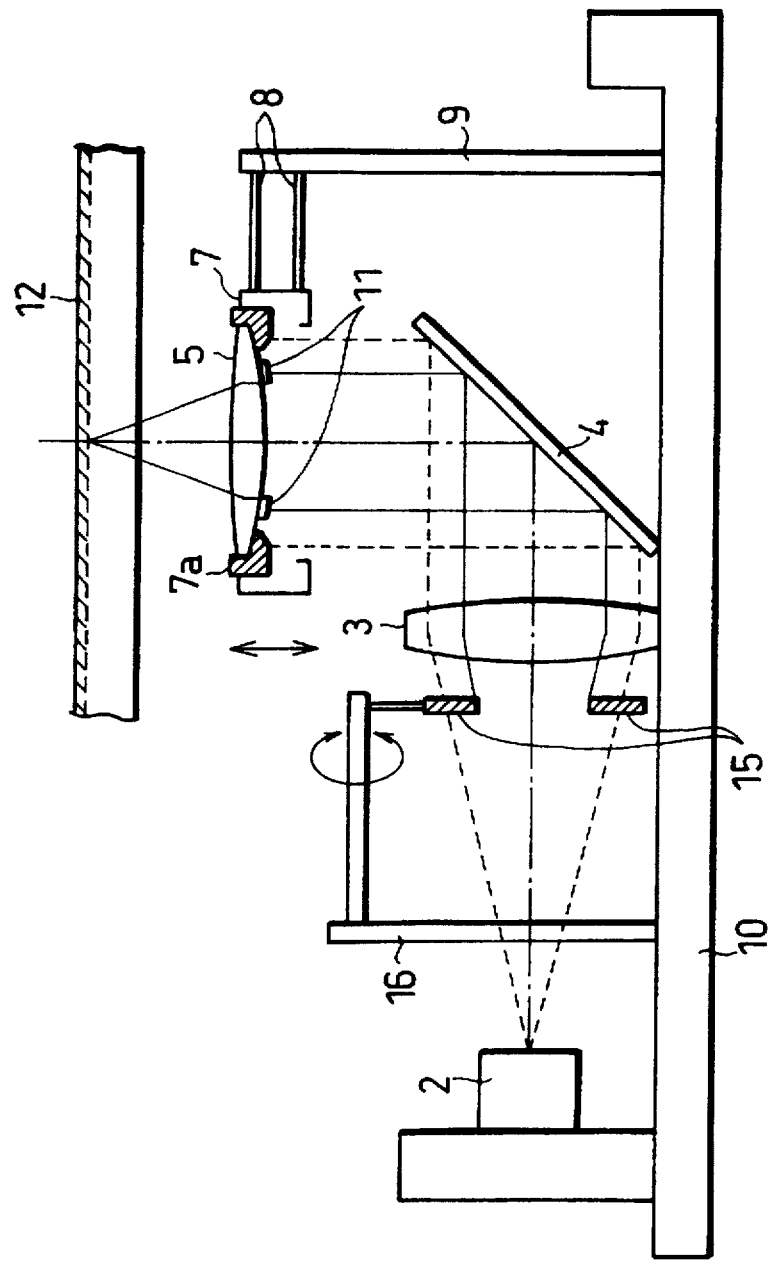
FIG. 14 is a view illustrating another arrangement of the optical recording and reproducing device of the present invention.
Figure 15:
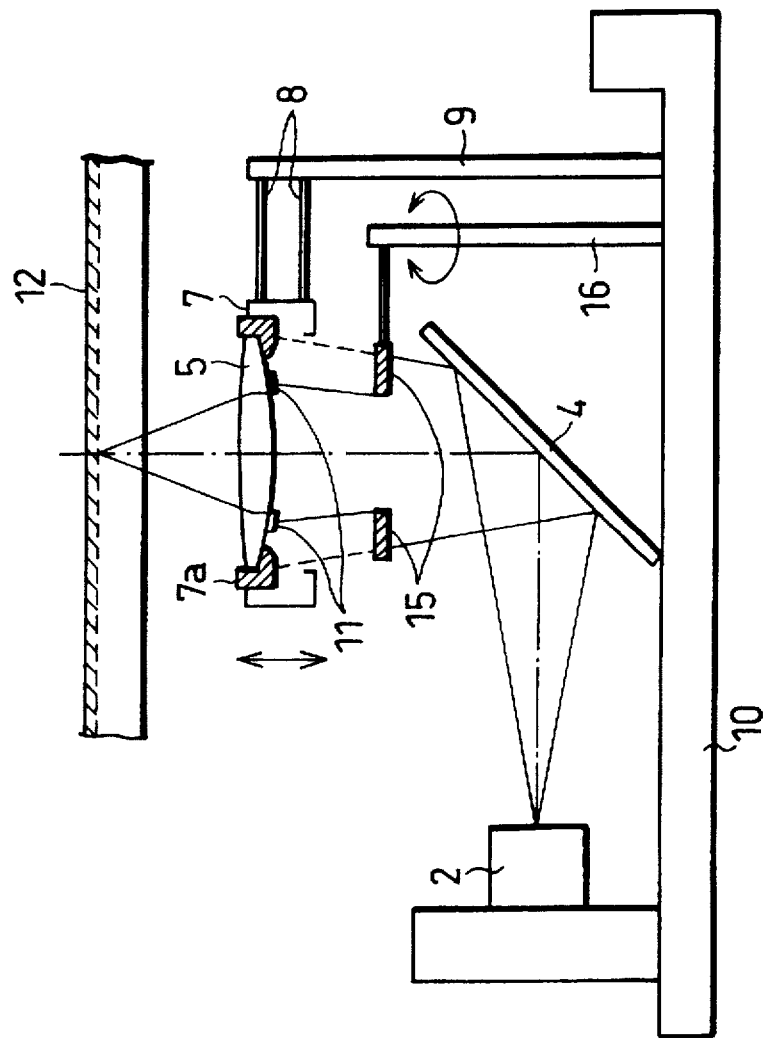
FIG. 15 is a view illustrating still another arrangement of the optical recording and reproducing device of the present invention.

Although in the present embodiment the aperture member 15 is provided in a collimated light flux between the reflection mirror 4 and the objective lens 5, the position of the aperture member 15 is not limited to this, but it may be provided at any position as long as it is between the light source 2 and the objective lens 5, irrelevant to the collimated light flux. As illustrated in FIG. 14, for example, the aperture member 15 may be provided between the light source 2 and the collimating lens 3. Alternatively, as illustrated in FIG. 15, the arrangement of the present embodiment may have a finite optical system wherein the collimating lens 3 is not provided. In these cases, substantially the same effect as that in the case of the arrangement shown in FIG. 1 can be achieved.

The invention is not limited by the description of the present embodiment that has only explained reproduction of information in the high-density disk 1 and the compact disk 12. The invention produces the same effect for recording and erasion of information in the information recording media as it does for reproduction thereof, by adopting the masking member 11.

As has been described so far, the optical recording and reproducing device of the present invention, for carrying out recording, reproduction and erasion of information by converging a light beam emitted from a light source on an information recording medium with the use of an objective lens, includes (1) a first aperture member for changing a light flux diameter of the light beam, the first aperture member being provided in an optical path of the light beam, and (2) a second aperture member having an aperture diameter smaller than an aperture diameter of an objective lens holding member which holds the objective lens, as well as smaller than an aperture diameter of the first aperture member, the second aperture member being concentric with the objective lens, provided in the optical path between the first aperture member and the information recording medium, and moving in an interlocked manner with the objective lens.

With the above arrangement, the light beam emitted form the light source is limited by the first and second aperture members so as to have a smaller diameter, and enters the objective lens. The light beam is converged by the objective lens, and is projected on the information recording medium. As a result, a light spot is formed on the information recording medium.

Here, since an aperture of the second aperture member is smaller than the aperture of the objective lens holding member which holds the objective lens and also smaller than the aperture of the first aperture member, the second aperture member determines the effective NA of the objective lens. Besides, since the second aperture member is concentric with the objective lens and moves in an interlocked manner, an optical axis of the light beam entering the objective lens does not deviate from the center of the objective lens even in the case where the objective lens, following the eccentricity of the disk or the like, shifts in the track direction of the information recording medium.

Incidentally, in a conventional arrangement, since it does not have the second aperture member, a shift of the objective lens in the track direction of the information recording medium causes the light beam, whose diameter has been reduced by the first aperture member, to deviate from a right optical path when entering the objective lens. Therefore, the light beam is not correctly converged, thereby resulting in that a light spot with an appropriate size cannot be formed on the information recording medium.

In contrast, in the arrangement of the present invention, in the case where the objective lens shifts in the track direction of the information recording medium, the second aperture member follows a shift of the objective lens, since the second aperture member is interlocked with the objective lens. As a result, unlike the conventional cases, the light beam to enter the objective lens does not deviate from the right optical path and is always caused to accurately enter the objective lens irrelevant to movements of the objective lens.

Therefore, a light spot having a suitable size can be formed on the information recording medium, not affected by, for example, movements of the objective lens. As a result, recording, reproduction and erasion of information can be stably carried out, whether or not the objective lens shifts. Thus, with the use of this arrangement, it is possible to provide liable devices of excellent quality.

Furthermore, in the optical recording and reproducing device, it is preferable that the first aperture member is provided separate and independent of the second aperture member.

With the above arrangement, since the first aperture member is provided separate and independent of the second aperture member, an information recording and reproducing device producing the same effect as that achieved with the aforementioned arrangement can be produced only by adding the second aperture member to a conventional optical recording and reproducing device, in the case where the conventional device has a conventional aperture member whose aperture diaphragm can be changed so as to become suitable for information recording media with different thicknesses. Thus, the device capable of producing the effect of the present invention can be manufactured easily.

Besides, in the optical recording and reproducing device, it is preferable that the second aperture member has an outside diameter smaller than a light flux diameter in the case where the first aperture is not placed in the optical path as well as smaller than the aperture diameter of the objective lens holding member, and that the first aperture member is movably provided so as to be freely installable in and removable from the optical path, and blocks light which would pass outside the periphery of the second aperture member in the case where being placed in the optical path.

With the above arrangement, in the case where the first aperture member is placed in an optical path of the light beam, light which would pass outside the periphery of the second aperture member is blocked by the first aperture member, thereby resulting in that the effective NA of the objective lens is determined by the second aperture member. On the other hand, in the case where the first aperture member is not placed in the optical path of the light beam, light passing through inside the second aperture member (i.e., through the aperture) and light passing outside the periphery of the second aperture member enters the objective lens. In other words, in this case, the light beam is projected on the objective lens with the light flux diameter of the light beam remaining unchanged, thereby resulting in that the effective NA of the objective lens is determined in accordance with the aperture of the objective lens holding member.

Therefore, different effective NA of the objective lens can be obtained in the case where the first aperture member is placed in the optical path and in the case where it is not placed in the optical path, that is, in the case where the light which would pass outside the periphery of the second aperture is blocked and in the case where it is not blocked. By doing so, the conversion position of the light beam projected on the information recording medium can be changed. Therefore, by thus arranging an optical recording and reproducing device, the device is capable of, even when used alone, accurately forming a light spot on disks having different thicknesses and recording densities. As a result, recording, reproduction, and erasion of information can be stably carried out with respect to different types of disks.

Furthermore, in the above-described optical recording and reproducing device, it is preferable that the second aperture member is made of either half-transparent or opaque material.

With the above arrangement, in the case where the second aperture is made of half-transparent material, the quantity of light blocked by the second aperture member decreases. In other words, the light beam projected on the second aperture is not completely blocked, but to some extent transmits the second aperture member. By thus arranging the second aperture member, decrease in the quantity of light converged on the information recording medium is prevented, especially in the case where the first aperture member is not placed in the optical path, i.e., the objective lens holding member determines the effective NA of the objective lens. As a result, recording, reproduction, and erasion of information can be stably carried out even with respect to information recording media having low reflectances, multilayer information recording media, and the like.

On the other hand, in the case where the second aperture member is made of opaque material, light projected on the second aperture member is completely blocked. Therefore, aberration can be prevented, particularly in the case where the first aperture member is placed in the optical path, that is, in the case where the effective NA of the objective lens is determined by the second aperture member. As a result, a desirable light spot can be formed on the information recording medium.

Moreover, in the aforementioned optical recording and reproducing device, it is preferable that the second aperture member is a ring-shaped masking member provided directly on a lens surface of the objective lens.

According to the above-described arrangement, the second aperture member is provided directly on the lens surface of the objective lens. Therefore, the arrangement can be simplified and the device can be lightened, while deviation of the second aperture member with respect to the objective lens due to aging is less likely caused. Therefore, mass production of high-performance second aperture members is possible.

Furthermore, in the aforementioned optical recording and reproducing device, it is preferable that the second aperture member is provided close to the objective lens, and is a transparent plate having a ring-shaped masking member.

According to the aforementioned arrangement, the second aperture member is a transparent plate having a masking member thereon, provided close to the objective lens. Therefore, in the case where it is necessary to change the second aperture member due to, for example, deterioration, only changing the transparent plate is required. Thus, there is no need to change other parts of the optical system, thereby ensuring that repair is easily carried out at a lower cost.

Furthermore, in the foregoing optical recording and reproducing device, it is preferable that the first aperture member has an outline size greater than a size of a cross section of a light flux proceeding to the objective lens, and that the aperture diameter of the first aperture member is substantially coincident with a mean diameter of the second aperture member, the mean diameter being a diameter of a circle whose circumference falls on center of width of the second aperture member, so that the aperture of the first aperture member coincides with the circle when the first aperture member and the second aperture member are concentrically positioned.

According to the above-described arrangement, the first aperture is provided so that the aperture of the first aperture member coincides with a circle whose circumference falls on center of width of the second aperture member. Therefore, in the case where the first aperture member is placed in the optical path, the light beam whose diameter is reduced by the first aperture member is projected inside the circle. Since the circle falls on the center of the width of the second aperture member, it is possible to cope with any shift of the objective lens, irrelevant to a direction of the shift, rightward or leftward with respect to the track direction of the information recording medium.

Besides, in the above-described optical recording and reproducing device, it is preferable that the second aperture member is a ring-shaped surface portion of one of surfaces of the objective lens, the ring-shaped surface portion being arranged so as to differ in cross-sectional shape from the other surface portion of the objective lens having an ordinary cross-sectional shape for a lens, the ring-shaped surface portion being formed so that light passing therethrough is not converged on the information recording medium.

According to the above-described arrangement, light projected on the ring-shaped surface portion of the objective lens is dispersed, or converged at a point not on the information recording medium where it would be converged, depending on shapes of the ring-shaped surface. Therefore, the same effect as that achieved with the use of the aforementioned masking member can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical recording and reproducing device, comprising:

a light source for emitting a light beam to be projected on an information recording medium;

an objective lens for converging the light beam on the information recording medium;

an objective lens holding member for holding said objective lens;

a first aperture member for changing a light flux diameter of the light beam, said first aperture member being provided in an optical path of the light beam, between said light source and said objective lens; and a second aperture member having an aperture diameter smaller than an aperture diameter of said objective lens holding member as well as smaller than an aperture diameter of said first aperture member, said second aperture member being concentric with said objective lens and moving in an interlocked manner with said objective lens.

2. The optical recording and reproducing device as set forth in claim 1, wherein said first aperture member is provided separate and independent of said second aperture member.

3. The optical recording and reproducing device as set forth in claim 1, wherein:

said first aperture member is movably provided so as to be freely installable in and removable from the optical path, and blocks light which would pass outside a periphery of said second aperture member in the case where being placed in the optical path; and said second aperture member has an outside diameter smaller than a light flux diameter in the case where said first aperture is not placed in the optical path, as well as smaller than a diameter of the aperture of said objective lens holding member.

4. The optical recording and reproducing member as set forth in claim 3, wherein:

said objective lens is designed so as to be suitable for a first information recording medium; and said second aperture member has an aperture diameter suitable for a second information recording medium, the second information recording medium differing from the first information recording medium in substrate thickness.

5. The optical recording and reproducing device as set forth in claim 1, wherein:

said first aperture member has an outline size such that said first aperture member partly blocks a light flux proceeding to said objective lens; and the aperture diameter of said first aperture member is substantially coincident with a mean diameter of said second aperture member, the mean diameter being a diameter of a circle whose circumference falls on center of width of said second aperture member, so that the aperture of said first aperture member coincides with the circle when said first aperture member and said second aperture member are concentrically positioned.

6. The optical recording and reproducing device as set forth in claim 1, wherein said second aperture member is made of half-transparent material.

7. The optical recording and reproducing device as set forth in claim 1, wherein said second aperture member is made of opaque material.

8. The optical recording and reproducing device as set forth in claim 1, wherein said second aperture member is a ring-shaped masking member provided directly on a lens surface of said objective lens.

9. The optical recording and reproducing device as set forth in claim 8, wherein the masking member is a dielectric multilayer film.

10. The optical recording and reproducing device as set forth in claim 8, further comprising:

a supporting member provided along a circumference of said objective lens, the masking member being positioned using a position of said supporting member as reference position; and a connecting member for connecting said supporting member and the masking member.

11. The optical recording and reproducing device as set forth in claim 1, wherein said second aperture member is provided close to said objective lens, and includes a transparent plate having a ring-shaped masking member.

12. The optical recording and reproducing device as set forth in claim 1, wherein said second aperture member is a ring-shaped surface portion of one of surfaces of said objective lens, the ring-shaped surface portion being arranged so as to differ in cross-sectional shape from the other surface portion of said objective lens having an ordinary cross-sectional shape for a lens, the ring-shaped surface portion being formed so that light passing therethrough is not converged on the information recording medium.

13. The optical recording and reproducing device as set forth in claim 12, wherein the ring-shaped surface portion has a cross-sectional shape of a concave.

14. The optical recording and reproducing device as set forth in claim 12, wherein the ring-shaped surface portion has an L-shaped cross-sectional shape of a concave.

15. The optical recording and reproducing device as set forth in claim 12, wherein the ring-shaped surface portion has a cross-sectional shape of a convex.

16. The optical recording and reproducing device as set forth in claim 12, wherein the ring-shaped surface portion has a cross-sectional shape of crepe.

17. The optical recording and reproducing device as set forth in claim 12, wherein said objective lens is a hologram lens having concentric concaves and convexes in series as said ring-shaped surface portion.

* * * * *